May 20, 1958  K. G. VADAS  2,835,826
SERIES PARALLEL STARTING CIRCUIT
Filed Dec. 11, 1956  2 Sheets-Sheet 1

INVENTOR.
KENNETH G. VADAS
BY
Fay & Fay
ATTORNEYS

May 20, 1958 K. G. VADAS 2,835,826
SERIES PARALLEL STARTING CIRCUIT

Filed Dec. 11, 1956 2 Sheets-Sheet 2

INVENTOR.
KENNETH G. VADAS
BY
Fay & Fay
ATTORNEYS

United States Patent Office 2,835,826
Patented May 20, 1958

2,835,826

SERIES PARALLEL STARTING CIRCUIT

Kenneth G. Vadas, Cleveland, Ohio

Application December 11, 1956, Serial No. 627,642

3 Claims. (Cl. 290—36)

This invention, relating as indicated to a series parallel starting circuit for vehicular equipment, is particularly directed to a starting circuit permitting modifications of a 6-volt, or, it could be a multiple thereof, 12-volt system, to twice their original voltage, as, for example, 12-volt if it is a 6-volt starting system, and 24-volt if a 12-volt system.

In general, in connection with starting circuits for vehicular equipment a number of developments have been provided, as, for example, in Snyder Patent No. 2,344,568, and in connection with Dugan Patent No. 2,521,969, Hueffed et al. Patent No. 2,725,488, Piumi Patent No. 2,761,978 and Leece Patent No. 2,248,244 for series parallel starting circuits. The need for these circuits is particularly emphasized in connection with special fuels where higher compressions are needed but is useful also in connection with regular vehicular equipment where the higher engine turnover and the higher starting torque of a 12-volt system will reduce starting problems in older equipment particularly, but also in new equipment. In general, in the past these systems have been complex, as indicated in the above patents, and quite expensive. Extensive use has not been the case.

This invention is particularly directed to a new and improved series parallel starting circuit having a control sub-circuit for converting two batteries from a parallel arrangement to a series arrangement with ground connections for the circuits, including normally closed thermal circuit breakers, which, under the surge of the first changeover from parallel to series, will surge and open during the period of starting and immediately reclose thereafter. This substantially reduces the number of relays in the circuit, uses the standard starting switches and does not require long control lines or heavy high-amperage electrical lines, which are expensive. It also substantially reduces the cost of the relay or other types of solenoid-operated circuit breakers.

An object of this invention is to provide a new and improved series parallel starting circuit for vehicular equipment having a control sub-circuit to convert a parallel arrangement to a series arrangement through a starting motor and having in the parallel connected lines to the batteries normally closed circuit breakers which open on the surge of current caused by the control sub-circuit, then reconnecting the lines in series.

A further object of this invention is to provide a new and improved combination in a series parallel starting circuit having a simplified number of connections and reconnections to the battery for the shift from parallel to series employing circuit breakers to reduce the number of control lines needed in this change of connections.

To the accomplishment of the foregoing and related ends, said invention then consists of the means hereinafter fully described and particularly pointed out in the claims, the following description setting forth in detail one approved means of carrying out the invention, such disclosed means, however, constituting but one of the various ways in which the principles of the invention may be used.

Figure 1:
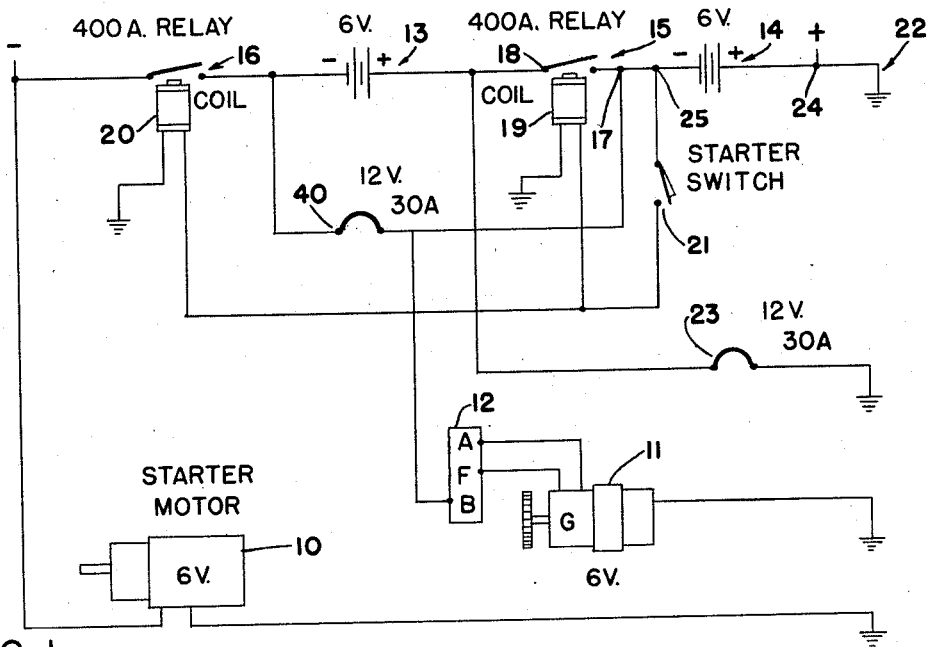
Fig. 1 is a diagram of my improved series parallel starting circuit for vehicular equipment. This illustrates the static condition.

In connection with the diagrammatic views, a starter motor is indicated at 10, which would be, for the example given, a 6-volt starter motor, and this particular example shows a 6-volt system which may be converted as by the addition of another battery, and the starter motor normally would be able to accept the additional loading, though, of course, a new starter motor could be installed in the system. In connection with this conversion, an additional battery is required, though special terminals may be employed on standard 12-volt batteries where the six volts could be used, or a special battery could be manufactured.

The starter motor 10 is shown on the left side of the diagram. The generator is shown at 11 having its terminal unit 12. One of the 6-volt batteries is indicated generally at 13, and the other battery is indicated at 14. Two heavy solenoid-operated relay switches are indicated generally at 15 and 16. Each of these has a plurality of contacts 17 and 18 for switch 15, and 27 and 28 for switch 16. These switches have solenoid coils 19 and 20, respectively, which activate the switches. In addition a starter switch is shown at 21, a ground at 22 and a normally closed circuit breaker, possibly of very durable contact points and quick-acting, is shown at 40 and 23. These are thermal circuit breakers, which are of an automatic resetting type. The ground would be connected to one of the batteries as by means of a junction indicated at 24 to the positive side of the battery. The negative side is connected to a further junction 25, and there is a branch to the starter switch 21. The two coils, which are coils to the heavy ampere relays indicated at 19 or 20, are connected in parallel. When the starter switch 21 is closed, electrical energy passes through each of the coils causing each of the relays 15 and 16 to close the contacts at 17 and 18 and at 27 and 28.

Figure 2:
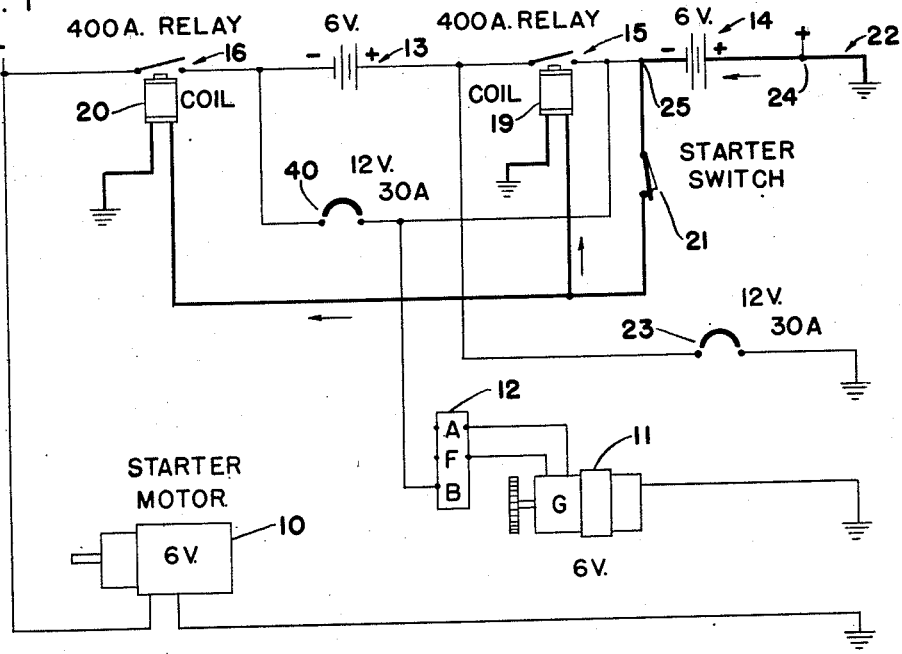
Fig. 2 is a diagrammatic view showing the control sub-circuit and the batteries in parallel.

This operation is diagrammatically shown in connection with Fig. 2 and, in brief, the positive side of the battery 14 is grounded as at 22, connected through junction 25 to the starting switch 21, through coil 19 and its parallel coil 20 and to ground. This energizes each of the relays causing the current surge from the battery to take the operation through the starter motor as is seen in connection with Fig. 3. That is to say, the heavy surge of current passes from battery 14 through junction 25, to another junction 26 across the relay 15 and its contacts 17 and 18, through the other battery 13 which is connected in series to relay 16, across its contacts designated 27 and 28 to the starter motor 10 and back to complete the circuit. Of course, it will be seen that there will be a short circuit around battery 14 as, for example, from the junction 24 near the ground through circuit breaker 23 and back to a common ground 29. This quick acting circuit breaker will then immediately open so that no short circuit is provided. The action of the other circuit breakers is substantially the same. The current instead of flowing through the two batteries will short circuit from junction 26 through the other circuit breaker 40, and this will normally open instantaneously.

Figure 3:
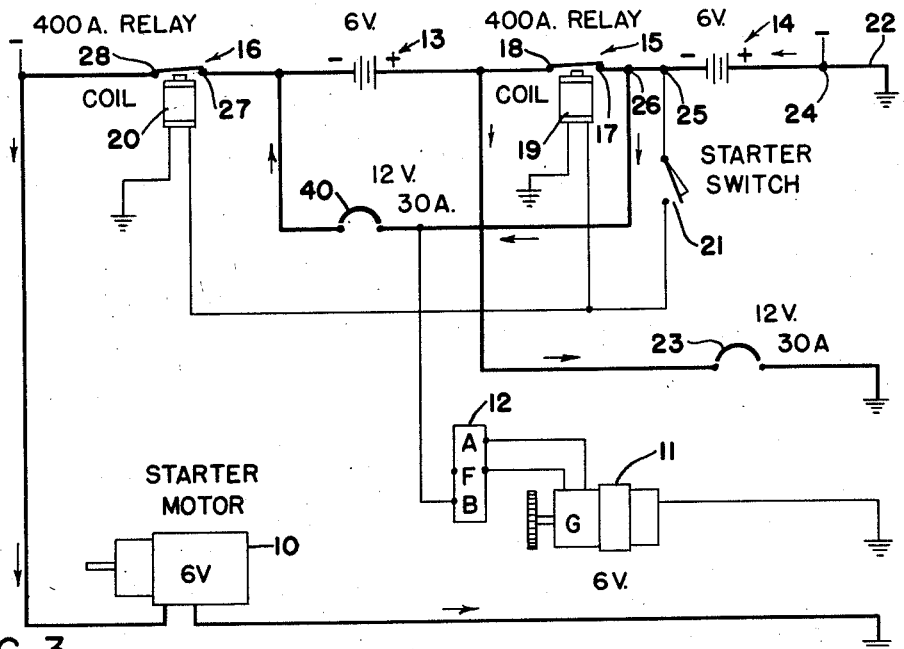
Fig. 3 is a diagrammatic view of the series parallel circuit showing the batteries at the moment of changeover from parallel to series.
Figure 4:
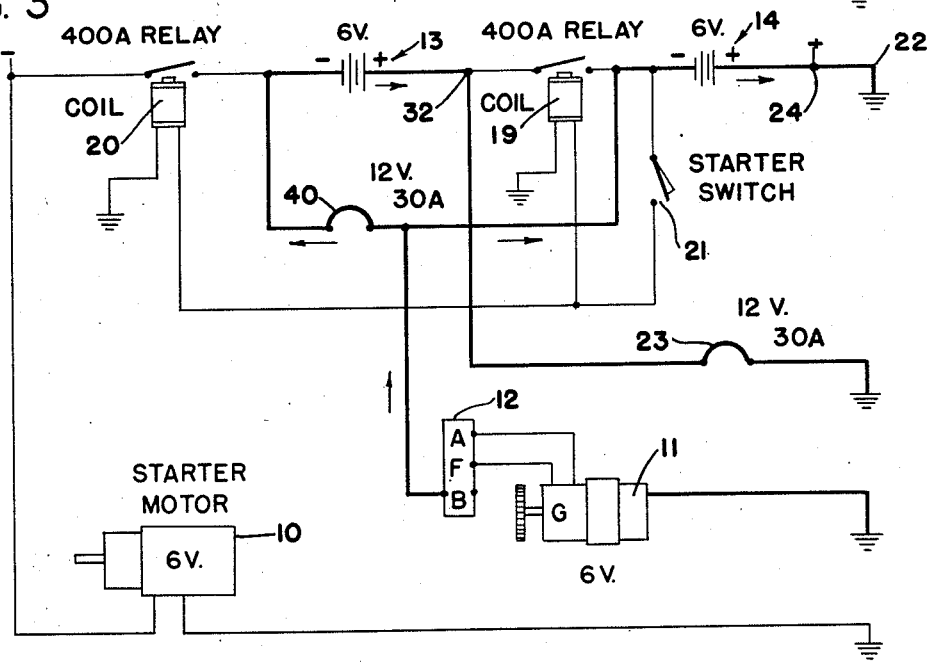
Fig. 4 is a diagrammatic view of my starting circuit showing the parallel circuit when the batteries are charging.

This series of operations can be seen diagrammatically in Figs. 1, 2 and 3. Fig. 4 shows the parallel operation of the batteries, and further in connection with this view the charging generator shown at 11 is connected by means of a terminal 12. One side of the generator is grounded at junction 30, this point being common to the ground 22. The other side of the generator passes to a junction 31 near one of the normally closed circuit breakers, and passes to battery 13 from the negative side and is connected to a junction indicated at 32 around to the other circuit breaker 23 and then to the ground. From junction 31 part of the current passes through battery 14 and is substantially in parallel. These circuit breakers with this amount of current do not open as they are normally closed circuit breakers and only open with a very heavy surge of current, such as by means of a short circuit.

In practice, then, this idea may be applied to starting circuits for vehicular equipment by adding one additional solenoid or other type starter switch, together with two circuit breakers of the type shown herein, and another battery or the conversion of a present battery to a multi-terminal 12-volt battery. It will be seen, of course, that in connection with this invention the 12-volt starting circuit can be converted to a 24-volt and by adaptation to multiples of this, if this is found to be desirable. With one of these conversions the two solenoid starter switches are used to make a series hook-up between the two 6-volt batteries. The line load is kept at 6-volts by taking from one of the batteries at all times. Two circuit breakers are used to put one battery in a parallel circuit for charging purposes. The circuit breakers open immediately when heavy series current is made and then close again in about 30 seconds, putting the battery again in the circuit for charging purposes. This series hook-up is 12-volts to the starting motor, giving higher cranking speeds which give better compression and faster starting results under all conditions. The starter circuit then has the advantage in that there is less cranking because the starting is much faster and the voltage drop is much reduced. It will be apparent, of course, that in the event a 6-volt starter motor is used, there is a possibility of overload or overheating of the starter motor but this is true of excessive cranking of any starter motor.

In conclusion, this series parallel starting circuit connects two batteries from a parallel arrangement into a series arrangement by adding to the circuit a solenoid-operated switch and by employing in the ground lines from the battery normally closed, quick acting circuit breakers which open on a surge of current as the batteries are converted from parallel operation to series operation. This reduces substantially the number of components, the relays and wiring used and reduces the cost of the conversion.

The solenoids, circuit breakers, starters and switches, which are standard equipment on present 6-volt vehicles, have been used to comprise the foregoing series parallel circuits. Without modification these solenoids, circuit breakers, starters and switches have proved satisfactory and have passed severe breakdown tests.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

I claim:

1. A series parallel starting circuit for vehicular equipment which comprises a plurality of storage batteries, a generator and a starter motor, said circuit comprising a generator sub-circuit comprising at least two batteries in parallel with a generator, circuit breaker means in each of the lines from one of the batteries which are quick acting, normally closed circuit breakers, a starter motor sub-circuit having each of the batteries in series with a solenoid-operated relay for connecting said batteries in series through the starter motor, a control sub-circuit through the starter switch connected to each of the relays for connecting said batteries to the starter motor, energizing said relays, whereby action of the control sub-circuit through the starter switch changes the batteries from parallel to series causing a heavy surge of current in the generator sub-circuit and opening the normally closed circuit breakers, whereby said current through the solenoid switches and batteries in series operates the starter motor.

2. A series parallel starting circuit for vehicular equipment which includes a generator circuit, a starter circuit, a control circuit for said starter circuit, said generator circuit comprising a plurality of storage batteries in parallel with a generator, a normally closed circuit breaker in each of said parallel battery circuits of a quick acting type, a starter circuit comprising a plurality of solenoid-operated relays for connecting said batteries in series with said starter, a control circuit for said relays with one of said batteries for energizing the relays and connecting the batteries in series, whereby said control circuit may be energized changing the batteries from parallel operation to series operation to start the starter in series, whereby the heavy surge through the series generator circuit will be interrupted by the circuit breakers and re-energized upon disengagement of the starter circuit.

3. The starter circuit of claim 1 in which said circuit breakers are thermal circuit breakers of an automatic resetting type.

References Cited in the file of this patent

UNITED STATES PATENTS

| | | |
|---|---|---|
| 1,067,631 | Woodbridge | July 15, 1913 |
| 2,248,244 | Leece | July 8, 1941 |
| 2,344,568 | Snyder | Mar. 21, 1944 |
| 2,521,969 | Dugan | Sept. 12, 1950 |
| 2,725,488 | Hueffed et al. | Nov. 29, 1955 |
| 2,761,978 | Piumi | Sept. 4, 1956 |